Aug. 16, 1966     T. NOVACK ETAL     3,266,881
GLASS DELIVERY METHOD
Filed Oct. 9, 1962
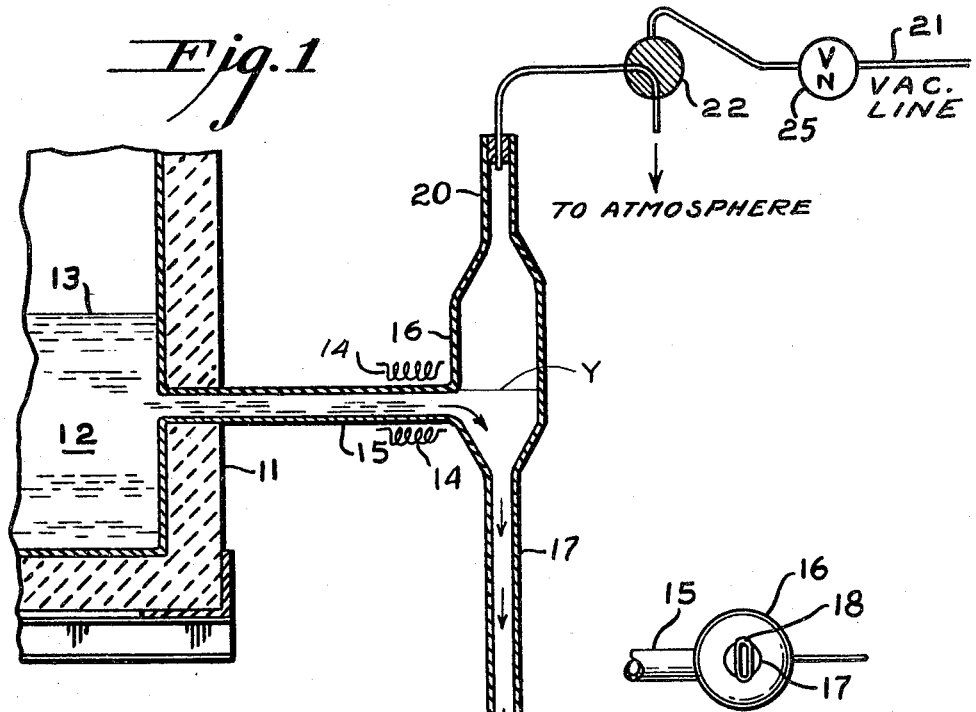
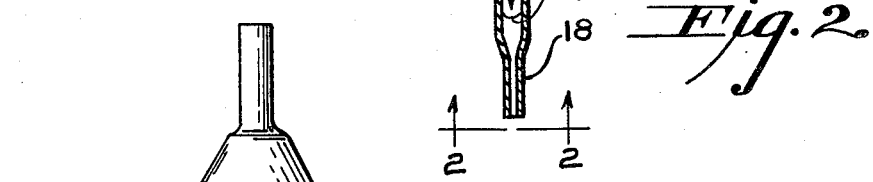
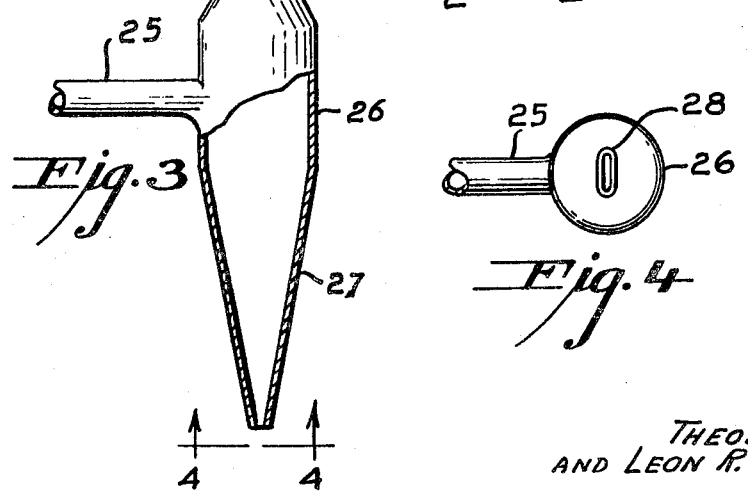
INVENTORS
THEODORE NOVACK
AND LEON R. SCHLOTZHAUER
BY Clarence R. Petty, Jr.
ATTORNEY

3,266,881
GLASS DELIVERY METHOD
Theodore Novack, Big Flats, and Leon R. Schlotzhauer, Painted Post, N.Y., assignors to Corning Glass Works, Corning, N.Y., a corporation of New York
Filed Oct. 9, 1962, Ser. No. 229,438
10 Claims. (Cl. 65—130)

This is a continuation-in-part of Serial No. 12,397, filed March 2, 1960, now abandoned.

This invention relates to an improved delivery system for molten or thermoplastic materials, liquids and the like which permits fluid flow to be varied independently of delivery temperatures, and more particularly to an improved method of and apparatus for continuously feeding molten glass at preselected uniform flow rates.

In certain glass forming operations, for example, it is desirable to continuously feed a stream of molten glass from a submerged passage at a predetermined rate of flow, and yet be able to easily change the rate of flow to produce a broad range of continuous flows so as to meet varying conditions. The rate of flow through a submerged passage communicating with a body of molten glass depends in part upon the viscosity of the molten glass, the level of the submerged passage relative to the top or head of the supply body, the diameter of the flow passage and the density of the glass. Although the use of vacuum for controlling the pulsing of glass delivery, such as in gobbing, has been known in the past, it has been necessary to utilize mechanical devices such as gates, stoppers, and the like to provide uniform flow rates of desired magnitude in continuous stream delivery systems. Such devices, however, have not been completely satisfactory since they are subject to extreme corrosive wear by the molten glass and, due to their lack of sensitivity, do not lend themselves to accurate control.

According to the present invention, a continuous delivery stream of molten glass may be provided with a desired uniform flow rate without necessitating the utilization of variable mechanical impedance devices within the glass flow itself. A submerged passage or metering tube, having an inlet end communicating with a source of supply of molten glass below the surface thereof, has an outlet end communicating with a vertically-extending conduit, tubular member, or delivery tube at a level intermediate its upper and lower ends. The metering tube preferably extends horizontally, and may communicate with the delivery tube at an elevation substantially midway between its ends and preferably not lower than its midpoint, but at a level below the head or surface of the supply of molten glass. The intersection of the metering tube should be at such a level so that the delivery tube extends downwardly below the metering tube a sufficient distance to form an extended cavity and provide a good working range of flow rates. Preferably the delivery tube is provided with an expanded chamber or reservoir adjacent the outlet of the metering tube, which chamber has a relatively large cross section compared to the cross section of the metering tube. If desired, the reservoir and delivery tube may in part comprise a generally conical body. In any form of construction, however, the output or outlet end of the metering tube and its union or communication with the delivery tube or reservoir is such so as to provide a smooth flow path to prevent the entrapment of air under the liquid which might form seed or blisters in the stream entering the delivery tube.

The upper end of the reservoir, or the upper end of the delivery tube when no reservoir is used, extends above the head or surface of the supply of molten glass and is connected to a line which may be either vented to the atmosphere or supplied with a suitable vacuum. The lower end of the delivery tube is provided with a suitable die or delivery orifice whose cross sectional shape is in accordance with that of desired product, for example, a rectangular slot for the delivery of the liquid in ribbon form.

Molten glass from the supply flows through the metering tube and, when a reservoir is applied, enters the reservoir and flows outwardly through the bottom thereof into and through the delivery tube extending downwardly therebelow. When the top of the reservoir or delivery tube is vented to the atmosphere, the rate of flow of glass through the outlet orifice of the delivery tube will depend upon the glass viscosity, the diameter and length of the metering tube, and the gravitational pull of the glass in the metering tube, due to the head of glass in the supply body. A small head of glass is formed in the delivery tube, due to the resistance to flow offered by the die, even when the upper portion of the delivery tube is vented to the atmosphere. The minimum flow rate possible with the system is provided under such conditions. Under such conditions, the rate of flow through the metering tube is at a minimum since the pressure drop between the inlet and outlet ends of the metering tube is predicated upon the substantially constant predetermined head of molten glass in the supply body above the metering tube; whereas, the flow through the die is also at a minimum since it is predicated upon the nominal hydrostatic head maintained in the delivery tube by the flow resistance offered by the die.

The flow rate through the metering tube and the delivery tube may be increased by connecting the line at the top of the delivery tube to a suitable vacuum and reducing the pressure in the reservoir. This increases the pressure drop or differential between the input and output ends of the metering tube, resulting in a greater flow therethrough. As the pressure in the reservoir is reduced, increasing the flow rate through the metering tube, the glass level in the vertical delivery tube rises until the flow rate established by the metering tube is attained. A predetermined hydrostatic head of molten glass is accordingly built up and maintained within the delivery tube during the application of a given vacuum. This uniform head, maintained in the delivery tube by the increased flow through the metering tube as a result of the vacuum, produces a uniform flow rate of increased magnitude through the die or outlet end of the delivery tube. In other words, the head of the glass maintained within the delivery tube plus the effect of the applied vacuum determines the flow rate through the die of such tube; the flow rate through the metering tube determines the head within the delivery tube; and, the amount of vacuum applied to the reservoir determines the flow rate through the metering tube. It is to be understood, however, that a continuous uniform flow rate is produced with each setting of vacuum applied to the reservoir, and the system is not primarily designed for pulsed delivery of glass such as would be utilized in gobbing.

The rate of glass flow through the metering tube and accordingly the delivery tube is governed by the pressure differential between the inlet and outlet ends of the metering tube, as may be varied with the amount of vacuum applied to the reservoir. The maximum flow rate which may be achieved for a given system is reached when the pressure within the reservoir is reduced sufficiently to maintain the glass level or head within the vertical delivery tube at the height of the metering tube. Where a vaccum is applied, which raises the height of the glass within the delivery tube above the top of the metering tube, no change in flow rate results, since the excess vacuum merely supports the column of glass within the delivery tube above the metering tube and does not effect delivery. In such a case, the system would be the same as if a closed delivery tube extended downwardly from the supply body of molten glass. However, up to such a time as the glass head within the delivery tube is raised to the top of the metering tube, the mass flow from the delivery tube is directly proportional to the pressure difference between the two ends of the metering tube.

It thus has been an object of the invention to provide an improved glass delivery system which permits the ready establishment of a variety of uniform flow rates as may be required in a forming process.

A further object has been to provide an improved delivery system which facilitates the attainment of uniform controlled flow rates without necessitating the utilization of mechanically-operable flow control parts positioned within the glass flow itself.

An additional object of the invention has been to provide a glass delivery system which may utilize a variety of orifice shapes, without effecting flow control.

These and other objects of the invention will be more apparent to those skilled in the art from the following disclosure and accompanying drawings in which:

FIGURE 1 is a somewhat schematic side elevational view in section illustrating a preferred embodiment of the invention;

FIGURE 2 is a bottom plan view taken along lines 2—2 of FIGURE 1;

FIGURE 3 is a side elevational view, partially in section, depicting an alternate form of structure in accordance with the invention; and FIGURE 4 is a bottom plan view of the device shown in FIGURE 3 taken along 4—4 of FIGURE 3.

Referring now to the drawings, and particularly FIGURE 1, a fragmental portion of a glass tank 11 having refractory bounding wall portions is shown containing a supply body of molten glass 12 having a substantially constant head or glass surface level 13. A thin-walled metering tube 15, having heating elements 14 associated therewith, is shown having an inlet end communicating with glass tank 11 below the surface 13 of the supply body 12, and an outlet end communicating with an expanded central housing portion of reservoir 16 forming a part of a delivery tube 17. The mean diameter of the reservoir is preferably greater than the mean diameter of the metering tube. The reservoir 16 has a bottom outlet communicating with delivery tube 17, which extends downwardly therefrom, and has a delivery orifice or outlet 18 at the bottom end thereof which may be formed into a die. The particular diameter of the metering tube and the diameter and length of the delivery tube depends upon the range of flow control desired. The reservoir 16 may be considered as a separate chamber or as an expanded intermediate portion of the delivery tube 17, which form a vertically-extending conduit or tubular member. The metering tube 15 intersects the delivery tube 17 substantially midway between its ends which extend from a height above the glass level 13 to a point below the bottom of the supply body 12.

The upper end of the reservoir 16 has a vacuum connecting tubular portion 20, shown connected to a vacuum line 21 through a two-way valve 22 for connecting the tube 20 either to exterior atmosphere or to the vacuum line. A needle valve 25 positioned within line 21 regulates the amount of vacuum which may be applied to the reservoir 16 through the vacuum connecting tube 20, to provide continuous flow control over a wide range of glass flow rates.

In the alternative arrangement shown in FIGURES 3 and 4, a delivery tube 27, in the form of a depending conical configuration of a reservoir 26, is employed in place of a delivery tube of tubular form, such as 17. The conical delivery tube 27 has an outlet 28 at its lower end which may be in the form of a die. As in the structure shown in FIGURE 1, a metering tube 25 communicating between a glass supply body and reservoir 26 is joined to reservoir 26 so as to assure that the glass issuing from metering tube 25 will enter the reservoir without trapping seed or blisters in the stream.

Since both embodiments of the invention operate on the same principal, the operation will be described with respect to the embodiment shown in FIGURES 1 and 2. When valve 22 is in the position shown in FIGURE 1, so that the reservoir is open to the atmosphere, the differential pressure between the inlet and outlet ends of the submerged metering tube 15 is produced by the head 13 of the molten supply body 12 above the metering tube 15. Due to the resistance of flow offered by the die 18, a small head of glass represented by $x$ is formed in the delivery tube 17. When the system is operated under such conditions, a minimum uniform flow rate is produced.

When the valve 22 is rotated so that the vacuum connecting tube 20 is in communication with the vacuum line 21, a pressure differential will exist across the ends of metering tube 15, depending upon the amount of vacuum applied by valve 25. Under such conditions, the pressure differential across metering tube 15 is effected by the pressure of the hydrostatic head 13 operating on the inlet end, augmented by the vacuum produced in reservoir 16, which operates on the outlet end of the metering tube. As the amount of pressure differential across such tube increases, such as by increasing the amount of vacuum in reservoir 16, the flow rate through the metering tube increases. As the pressure in the reservoir 16 is reduced, increasing the flow rate from the metering tube 15, the glass level in the vertical delivery tube 17 increases until the flow rate established by the metering tube is attained through the outlet 18. As a result, a head of molten glass is built up and maintained within the delivery tube 17 which produces a uniform flow of desired flow rate through the outlet or die 18.

In other words, the head of molten glass maintained in the delivery tube 17 plus the effect of the vacuum determines the flow rate through die 18; the flow rate through the metering tube 15 determines the amount of head maintained in delivery tube 17; and the amount of vacuum applied to the reservoir 16 determines the flow rate through the metering tube 15. However, the maximum flow rate which may be obtained through outlet or die 18 is reached when the vacuum within reservoir 16, as controlled by valve 25, is lowered to such an extent so as to maintain the glass within the delivery tube 17 at a level $y$ equal to the height of the metering tube 15.

As a specific example of the method of operation, it may be assumed that the head 13 of the supply body of molten glass 12 is two inches above the top of the metering tube 15 where it communicates with tank 11, and that the diameter and length of the tube are 5/8 inch and 15 inches respectively. It may also be assumed that the delivery tube 17, extending a substantial distance below the lowest level at which the supply body enters the metering tube, has dimensions similar to the metering tube, and that the die 18 terminates substantially immediately above a traveling receiving surface or forming apparatus. Assuming that the level of glass in tank 11 is maintained constant and its viscosity is maintained at 250 poises, with the reservoir connected to the exterior atmosphere glass will flow through the metering tube 15, the reservoir 16 and on through the delivery tube 17 at approximately 9 pounds per hour. If valve 22 is operated to connect reservoir 16 with vacuum line 21 through needle valve 25, the rate of glass flow can be increased in accordance with the setting of valve 25. If valve 25 is so set as to create sufficient vacuum in reservoir 16 to raise the level of glass therein the maximum amount, i.e. to the top level of the exit end of the metering tube 15, the rate of glass flow will be increased to approximately 50 pounds per hour.

By increasing the diameter of the metering tube and the length of the delivery tube, greater flow rates may be acquired. Further, since the rate of flow is inversely proportional to the viscosity of the glass, which in turn is dependent on its temperature, it is possible to preset the range of obtainable flow rates by controlling the temperature, and accordingly viscosity, of the glass feed through the metering tube 15, by means of heating units 14 associated with the tube. By increasing the temperature of the glass delivered by metering tube 15, a higher range of flow rates are obtainable through outlet 18.

The feeding operation is similar when the alternative form shown in FIGURES 3 and 4 is utilized, however, it is less sensitive to fluctuations of pressure, since the air chamber above the glass in the tube 27 is of far greater capacity than in the air chamber above the glass in tube 17.

As will be understood, the rates of glass flow will vary from the foregoing with variations in form or dimension of the structure employed from those specifically mentioned as well as with variations in viscosity and/or density of the glass per se.

Although we have disclosed the now preferred embodiments of our invention it will be apparent to those skilled in the art that various changes and modifications may be made thereto without departing from the spirit and scope thereof as defined in the appended claims.

We claim:

1. A method of feeding a liquid from a supply body which comprises, continuously feeding a stream of such liquid from below the surface of the supply body to a substantially vertical delivery conduit intermediate its ends, forming a head of such liquid adjacent a lower delivery end of such conduit, applying a constant desired degree of vacuum to such conduit to maintain a predetermined pressure differential between the ends of such supply stream and control the rate of flow thereof, and flowing the supply stream into such delivery conduit at a desired rate to maintain a predetermined head of such liquid within the delivery conduit, thereby effecting a uniform desired rate of flow through the delivery end.

2. A method of feeding a stream of liquid at a desired uniform rate from a supply body thereof which includes, feeding a stream of liquid along a supply path from below the surface of such supply body to a delivery tube so as to subject the stream flowing along such path to the head of such liquid within the supply body, forming a head of such liquid adjacent a lower delivery end of such delivery tube, connecting a regulatable source of sub-atmospheric pressure to the delivery tube, regulating the amount of sub-atmospheric pressure supplied to the delivery tube to create a constant predetermined pressure differential across the ends of the supply path and thereby control the rate of flow of such liquid therethrough and into the delivery tube so as to maintain a constant desired head therein, and continuously flowing such liquid at a uniform desired flow rate through the delivery end of such tube under such constant head.

3. A method of feeding a stream of liquid of uniform viscosity at a uniform flow rate which comprises, flowing a submerged stream of such liquid from a supply body thereof so as to subject it to the substantially constant head within the supply body, directing such stream into a confined space from which the liquid is free to flow by gravity through a delivery passage, and continuously applying a predetermined degree of sub-atmospheric pressure to such confined space to create a desired differential in pressure between the ends of such submerged stream and induce a uniform rate of flow from the supply body to the delivery passage.

4. A method of feeding a stream of liquid from a supply body which comprises, feeding a stream of such liquid through a passage having an inlet end communicating with the supply body below the surface thereof and an outlet end communicating with a delivery conduit, flowing the liquid into said delivery conduit at a rate sufficient to maintain a head of such liquid in the delivery conduit, issuing the liquid therefrom at a uniform rate determined by such head, and regulating the rate of flow of such liquid through the passage to adjust the head of such liquid maintained in the delivery conduit and provide a desired rate of issuance therefrom by subjecting the outlet end of such passage to a partial vacuum to create a desired differential in pressure across such passage.

5. A method as defined in claim 4 wherein the rate of flow through such passage, and accordingly the head of liquid maintained in the delivery conduit and issuance rate therefrom, is increased by increasing the degree of vacuum applied to the outlet end of such passage and thereby increasing the differential in pressure between the inlet and outlet ends of such passage.

6. A method of feeding a continuous stream of molten glass from a supply body at a predetermined rate of flow which comprises, issuing glass from a supply body through a metering passage at a level below the surface of the supply body to an intermediate level of a confined space of relatively large cross section compared to the cross section of the metering passage, issuing the molten glass by gravity from a lower region of such confined space through an extended delivery passage having a restricted outlet, and regulating the rate of glass flow through the outlet by applying a predetermined vacuum to the confined space above the metering passage to create a desired pressure differential between the ends of the metering passage and thereby produce a desired flow rate therethrough to maintain a predetermined head of glass within the delivery passage.

7. A method of feeding molten glass at a uniform desired flow rate from a submerged outlet of a container of molten glass to a delivery position located at a level substantially below the bottom level of the outlet which comprises, feeding glass from the submerged outlet and under the pressure of the head of the molten glass within the container through a metering passage into the side of a chamber, issuing molten glass from the bottom of such chamber by gravity via a path maintained closed to the atmosphere by the issuing glass, and applying a desired degree of sub-atmospheric pressure to such chamber above the metering passage to establish a greater diferetial pressure across the ends of such metering passage than that produced by the head of glass alone and accordingly provide an increased flow rate of glass therethrough to build up a head of glass in the chamber above a level that would otherwise prevail by the unaided flow and thereby aid gravity in the issuance of glass from the bottom of the chamber.

8. A method of feeding molten glass from a submerged outlet of a supply body thereof which comprises, flowing glass under the head of such body through a reservoir chamber into the top end of a vertically-disposed circumferentially defined tubular member communicating with the lower end of the reservoir chamber, and applying a desired sub-atmospheric pressure to the reservoir chamber for complementing the head of glass in the supply body and establishing a desired increased rate of flow of glass from the supply body to maintain an increased head of glass in the tube and thereby provide an accelerated rate of flow of glass through such tube.

9. A method as defined in claim 8 wherein the desired sub-atmospheric pressure is continuously applied to the reservoir chamber to continuously maintain the newly established head of glass and its flow rate constant.

10. An improved method of providing controlled uniform flow rates of molten glass from a supply body thereof through a delivery orifice which comprises, feeding a stream of molten glass from below the surface of such supply body along a metering passage to a delivery conduit, applying a controlled quantity of heat to the glass flowing through the metering passage to maintain a desired uniform viscosity, subjecting the outlet end of the metering passage to a predetermined vacuum so as to create a desired differential in pressure across the ends of such passage and produce a desired constant rate of flow therethrough, flowing the glass into the delivery conduit at such desired constant rate to maintain a predetermined head of molten glass in such delivery conduit above a delivery orifice, and issuing the glass through such orifice by gravity at a uniform rate of flow as predicated by such head.

References Cited by the Examiner

UNITED STATES PATENTS

| | | | |
|---|---|---|---|
| 1,514,091 | 11/1924 | Lott | 65—131 |
| 2,058,149 | 10/1936 | Haub | 65—131 |
| 2,249,371 | 7/1941 | Winder | 65—329 |
| 2,306,164 | 12/1942 | Harrison | 65—329 |

DONALL H. SYLVESTER, *Primary Examiner.*

D. CRUPAIN, *Assistant Examiner.*